Figure 1:
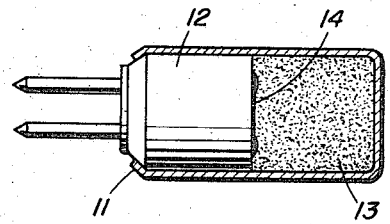

Sept. 12, 1967     H. S. LEOPOLD     3,340,808
ONE COMPONENT DETONATOR REQUIRING LOW FIRING ENERGY Filed Oct. 18, 1963     6 Sheets-Sheet 1

INVENTOR.
Howard S. Leopold
BY
ATTORNEY

Sept. 12, 1967         H. S. LEOPOLD         3,340,808

ONE COMPONENT DETONATOR REQUIRING LOW FIRING ENERGY

Filed Oct. 18, 1963         6 Sheets-Sheet 4

COMPOSITION
(MILLED PVA LEAD AZIDE / PETN)
A 80/20
B 60/40
C 40/60

30,000 PSI LOADING PRESSURE

INVENTOR.
Howard S. Leopold
BY
ATTORNEY.

Sept. 12, 1967        H. S. LEOPOLD        3,340,808
ONE COMPONENT DETONATOR REQUIRING LOW FIRING ENERGY
Filed Oct. 18, 1963        6 Sheets-Sheet 5

INVENTOR.
Howard S. Leopold
BY
ATTORNEY.

United States Patent Office 3,340,808
Patented Sept. 12, 1967

3,340,808
ONE COMPONENT DETONATOR REQUIRING LOW FIRING ENERGY
Howard S. Leopold, Silver Spring, Md., assignor to the United States of America as represented by the Secretary of the Navy
Filed Oct. 18, 1963, Ser. No. 317,388
2 Claims. (Cl. 102—28)

The invention described herein may be manufactured and used by or for the Government of the United States of America for governmental purposes without the payment of any royalties thereon or therefor.

The present invention relates to explosive detonators and more specifically to a detonator employing a binary mixture consisting of a primary explosive and a secondary explosive. The primary explosive consists of either silver azide or lead azide (PbN6). The secondary explosive or base charge as it is often referred to may consist of either pentaerythritol tetranitrate (commonly referred to in the explosive arts as PETN) or cyclotrimethylenetrinitramine (commonly referred to in the explosive arts as RDX).

It has been the general practice in the explosive arts to use three different explosive charges of varying sensitivity in the design of conventional detonators. These charges are typically an ignition charge which provides the desired initial firing sensitivity when fired by a bridgewire or the like, an intermediate charge which builds rapidly from burning to detonation and positioned adjacent the ignition charge, and thirdly a less sensitive but more powerful base charge positioned adjacent the intermediate charge and which has a detonation velocity greater than that of the ignition or intermediate charges. One disadvantage of using three separate charges in building detonators is that they must be placed in a definite order of varying sensitivity within a container. Where loading of these containers is done on a large scale and there are many charges of varying sensitivity used in loading, errors could obviously arise in the order of sensitivity in which these charges are packed in a container, and such errors in turn would cause a misfiring or render the detonator totally inoperative.

Another disadvantage in using three components in a single detonator is that the sensitivities and component lengths of the primary or ignition charge, the intermediate charge and the more powerful base charge must be preselected in relation to each other to provide a desirable explosive transition from the more sensitive primary component to the less sensitive base charge.

The general purpose of the present invention is to provide a one component detonator having all of the advantages of the two and three component prior art detonators and possessing none of the aforedescribed disadvantages. The present invention employs a binary mixture as a substitute for the three charges normally used and the mixture retains the sensitivity of the most sensitive component of the mixture and develops a detonation velocity characteristic of the faster reacting base charge. The use of a one component detonator will decrease the number of explosive charges needed in a single detonator thereby decreasing charge interface transfer problems. Determinations of column lengths for the various charges loading errors as mentioned above will be totally eliminated. Loading and construction will be greatly simplified and the time required for actual loading will be reduced.

An object of the present invention is to eliminate interface transfer problems heretofore presented in the detonation of two and three component detonators wherein the required varying degrees of sensitivity for the plurality of charges used was a significant factor in detonator construction.

Another object of the invention is to provide a binary mixture having a sensitivity and detonation velocity heretofore unavailable in the absence of employing two or three separate charges.

A still further object of the invention is to provide an explosive detonator which is simple to load and does not easily lend itself to loading errors quite common in loading two and three component detonators.

Figure 2:
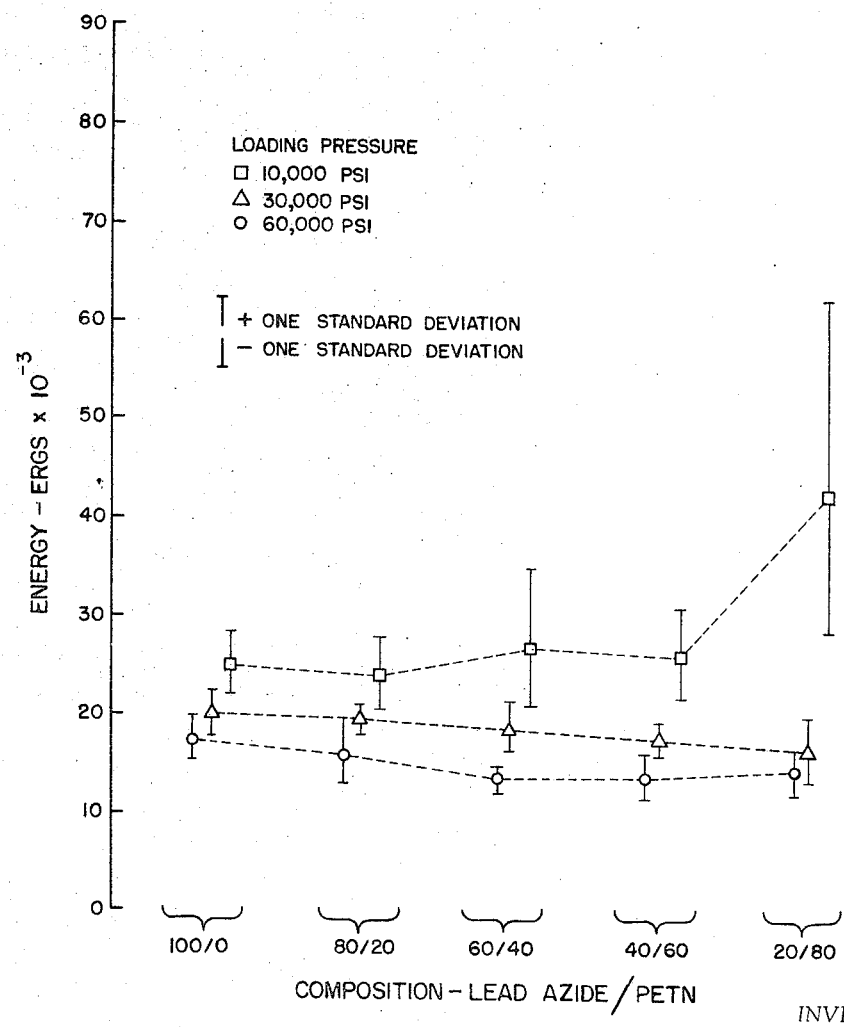
Figure 3:
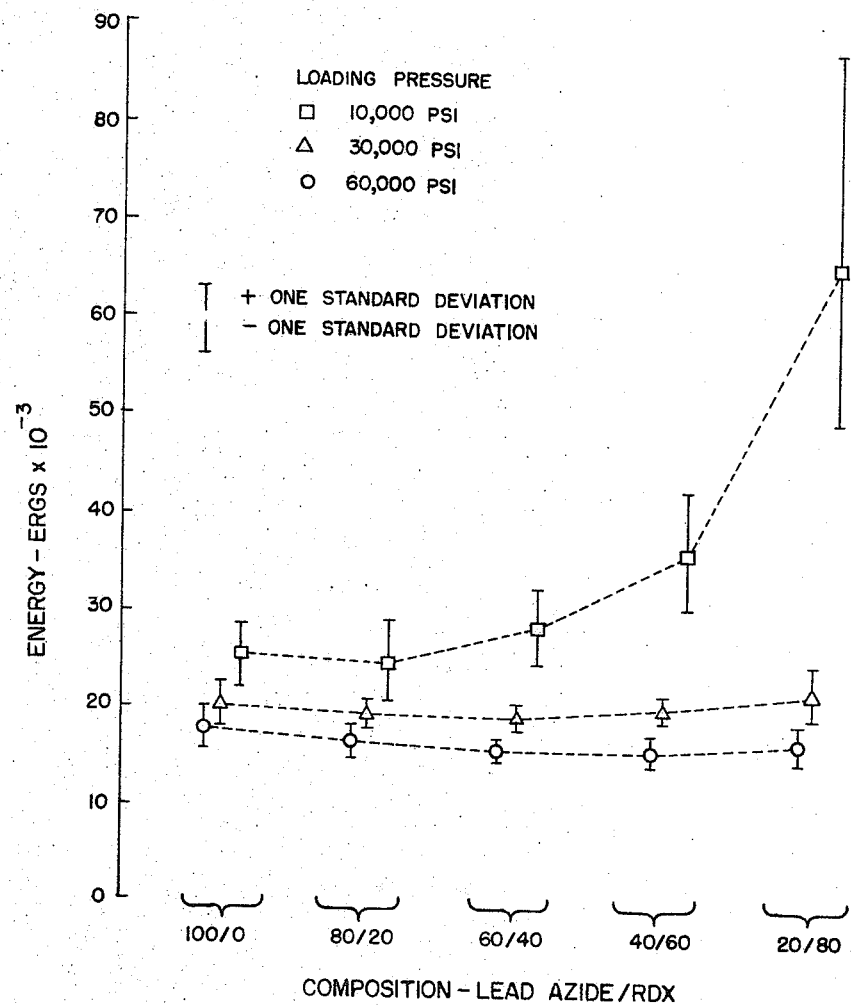
Figure 4:
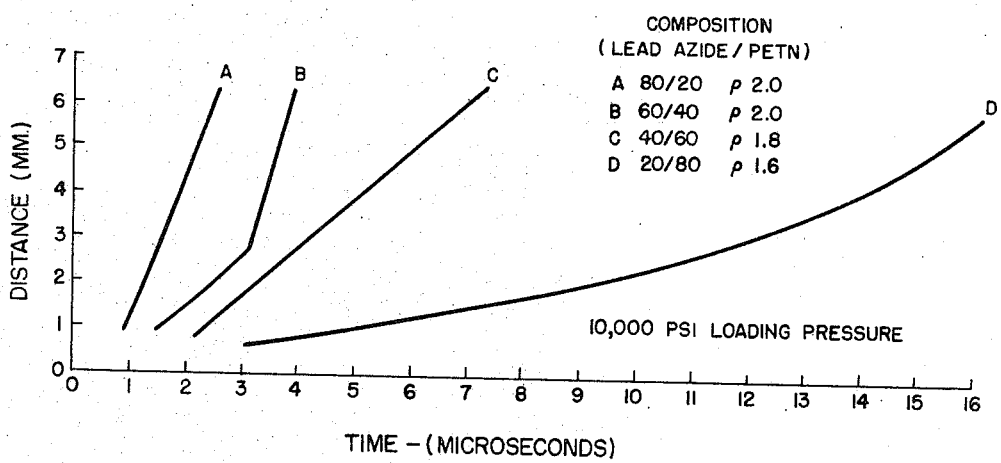
Figure 5:
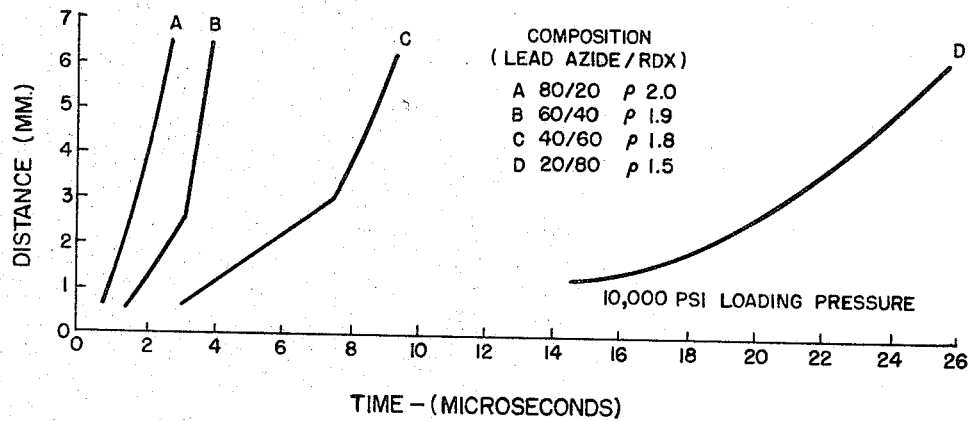
Figure 6:
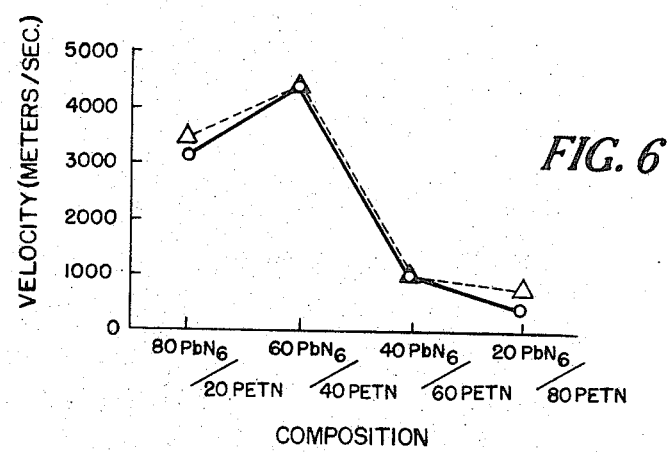
Figure 7:
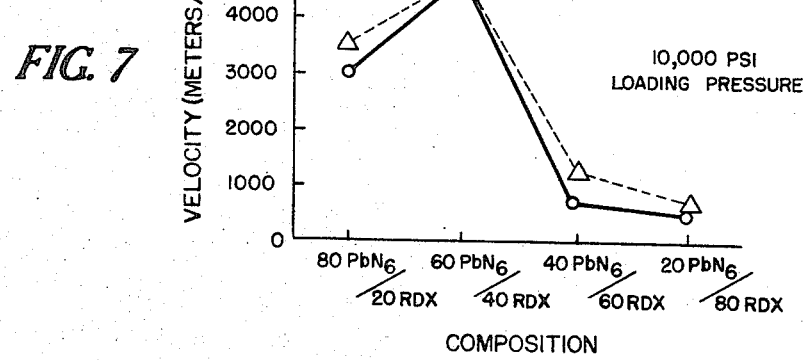
Figure 8:
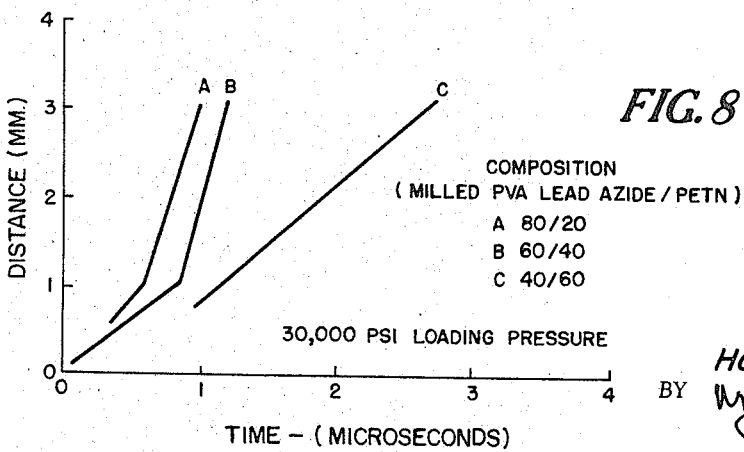
Figure 9:
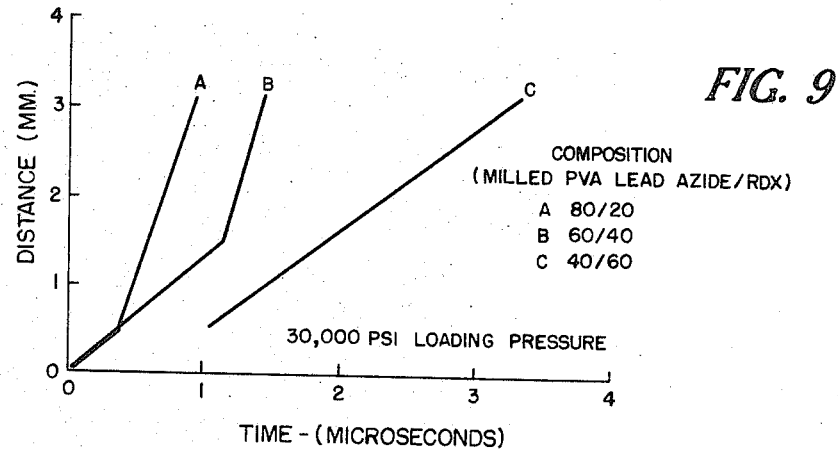
Figure 10:
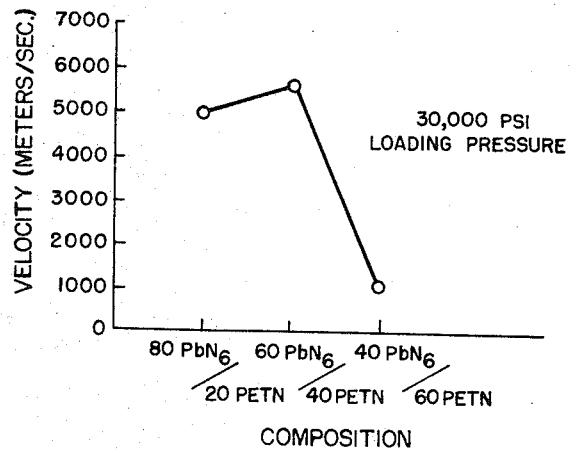
Figure 11:
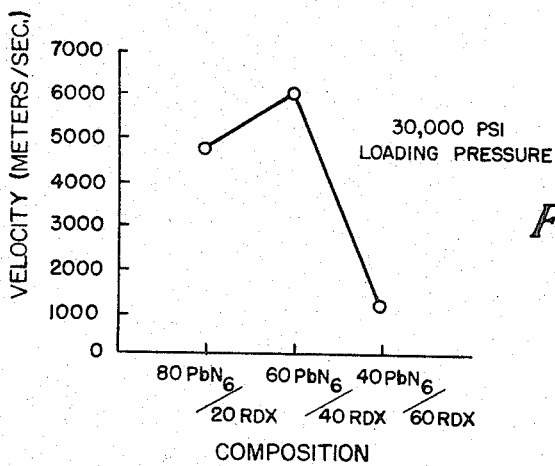
Figure 12:
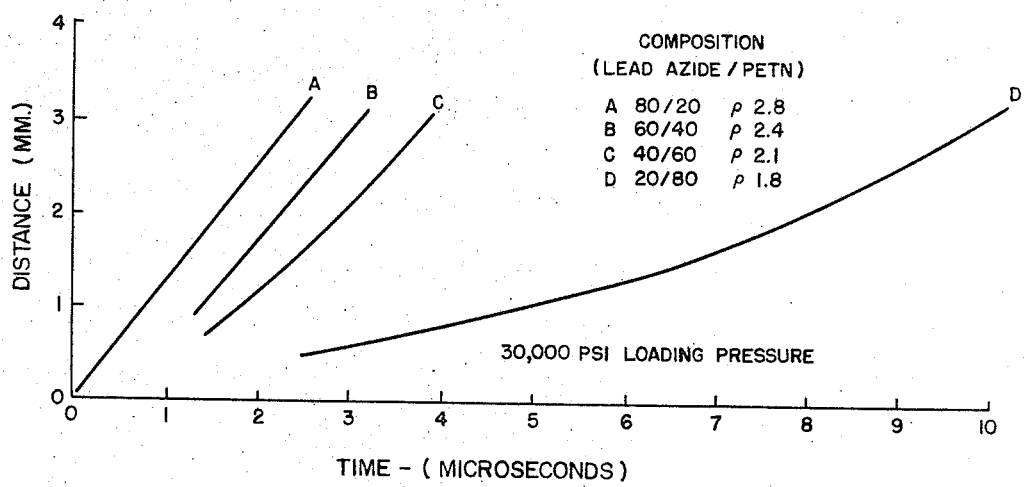
Figure 13:
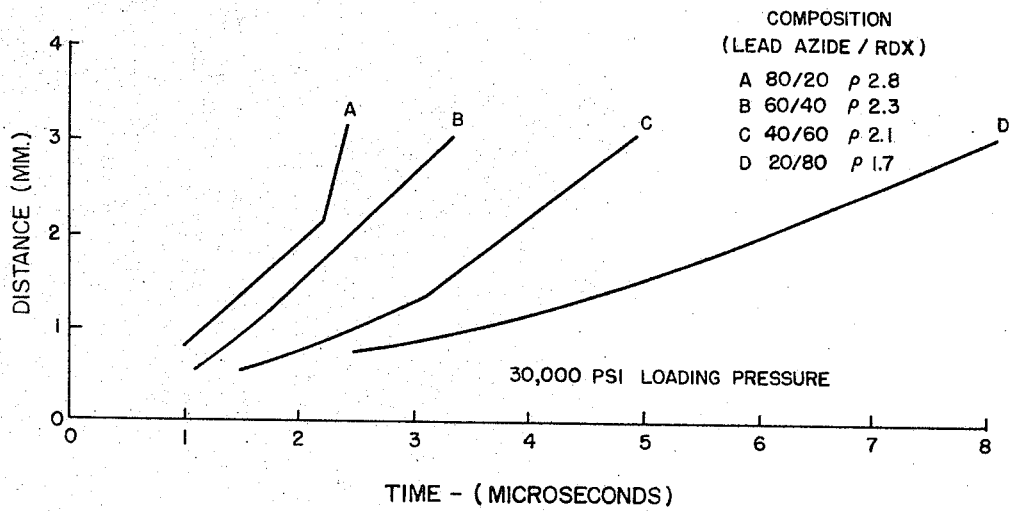

Various other objects and many of the advantages of this invention will be readily appreciated from the following description of the accompanying sheets of drawings in which:

FIG. 1 illustrates a detonator assembly;
FIG. 2 is a graph illustrating the mean firing energies of milled dextrinated lead azide/PETN mixtures for various ratios of lead azide and PETN and under various loading pressures;
FIG. 3 is a graph illustrating the mean firing energies of milled dextrinated lead azide/RDX mixtures for various ratios of lead azide and RDX and under various loading pressures;
FIG. 4 is a graph illustrating the growth of explosion in milled dextrinated lead azide/PETN mixtures;
FIG. 5 is a graph illustrating the growth of explosion in milled dextrinated lead azide/RDX mixtures;
FIGS. 6 and 7 respectively are graphs showing the variation of detonation velocity of milled dextrinated lead azide/PETN and milled dextrinated lead azide/RDX mixtures with a variation of composition ratios of said mixtures;
FIGS. 8 and 9 illustrate the growth of explosion in mixtures containing milled polyvinyl alcohol (PVA) lead azide and PETN and milled PVA lead azide and RDX;
FIGS. 10 and 11 illustrate terminal detonation velocities of mixtures containing milled PVA lead azide and PETN and milled PVA lead azide and RDX; and
FIGS. 12 and 13 illustrate the growth of explosion in mixtures of milled dextrinated lead azide and PETN and milled dextrinated lead azide and RDX.

Referring to FIG. 1 there is shown a cylindrical container 11 having an initiator plug 12 inserted in one end thereof. Opposite the plug end of the initiator plug there is bridgewire 14 which is in intimate contact with binary mixture 13 as will be hereinafter described. The loading pressures of the binary mixture may vary from 10,000 to 30,000 pounds per square inch (p.s.i.).

The binary mixture 13, as will be seen from the various graphs in the remaining figures, consists essentially of a mixture of either PETN or RDX and one of several forms of lead azide.

FIG. 2 shows the results obtained by exploding milled dextrinated lead azide/PETN mixtures and these mixtures retained approximately the sensitivity of the milled dextrinated lead azide. The 20/80 mixture of lead azide/PETN loaded at 10,000 p.s.i. was an exception. With an increase in loading pressure for the dextrinated lead azide, the mixtures exhibit an increase in hot wire sensitivity. FIG. 3 illustrates the hot wire sensitivity of milled dextrinated lead azide/RDX mixtures at the same loading pressures shown in FIG. 2. Those loaded at 10,000 p.s.i. have the highest standard deviation and show a rapidly decreasing sensitivity as the RDX percentage increases. The standard deviation is smaller at the higher loading pressures. The RDX mixtures also indicate an increased sensitivity as the loading pressure is increased.

A graphical comparison of the build-up of four PETN mixtures is shown in FIG. 4. The RDX mixtures in FIG. 5 at the same loading pressures gave results very similar to those of the PETN mixtures and a graphical comparison of the build-up for the four RDX mixtures is shown in FIG. 5. With both PETN and RDX, the 60/40 mixture gave the optimum detonation velocity at the observed distance as shown in FIG. 6 and FIG. 7. Samples of milled dextrinated lead azide at a density of 3.0 grams per cubic centimeter (approximately 10,000 p.s.i. loading pressure) gave an average terminal detonation velocity of 3140 meters per second under the same confinement.

Referring now to FIG. 12, it can be seen that a definite change in the build-up or growth of explosion occurs at increased loading pressures. With PETN, the propagation velocity of the 80/20 mixture exploded under 30,000 p.s.i. was found to be 1250 meters per second, much lower than expected. There is no evidence of a velocity characteristic of PETN, and the burning velocity is much lower than anticipated for the lead azide. The mixtures containing larger proportions of the PETN give even lower propagation rates.

In FIG. 13 dextrinated lead azide/RDX mixtures at a loading pressure of 30,000 p.s.i. illustrate different characteristics from those mixtures loaded at 10,000 p.s.i. Namely, the 80/20 mixture has an initial velocity of 1240 meters per second before abruptly changing about 2 millimeters from the bridgewire to a detonation velocity characteristic of RDX (5340 meters per second). Other mixtures containing larger percentages of RDX give lower burning velocities.

Lead azide which has been precipitated in the presence of polyvinyl alcohol (PVA) has been used as a substitute for dextrinated lead azide and sensitivity tests have disclosed that milled PVA lead azide is more sensitive to hot wire initiation than milled dextrinated lead azide. The growth to detonation characteristics, detonation velocity, and hot wire sensitivity all indicate that PVA lead azide would be a desirable substitute for dextrinated lead azide in the binary mixtures.

The build-up to detonation of milled PVA lead azide/PETN and milled PVA lead azide/RDX mixtures loaded at 30,000 p.s.i. has been observed. The results are shown in FIGS. 8 and 9. The build-up of the 80/20 and 60/40 mixtures of both PETN and RDX show a low velocity regime, transitory, but of stable velocity. This low velocity regime abruptly changes to a higher velocity indicative of the PETN or RDX.

FIGS. 10 and 11 show that an improvement in the terminal detonation velocity was obtained as expected over the mixtures containing dextrinated lead azide. Optimum terminal detonation velocities were observed with 60/40 mixtures.

A definite minimum amount of confinement is necessary for optimum performance when the detonator in FIG. 1 is exploded. This may require a slight increase in size over conventional three charge component detonators but such is necessary in order that the binary mixture attain a maximum detonation velocity and approach a complete reaction before the blasting cap or container gives way. It has been shown that only a small volume of lead azide is necessary for the binary mixtures to retain the hot wire sensitivity of lead azide. At a loading pressure of 10,000 p.s.i., the dilution effect is apparent with the higher percentage of secondary explosive or base charge, but at loading pressures of 30,000 p.s.i. and higher, the effect disappears. Because of the crystal density of the lead azide compared to the secondary explosives, the crystal volume proportion occupied in the mixtures by the lead azide is smaller than its weight proportion in the mixture. A mixture containing only 9.2 percent lead azide by volume has about the same hot wire sensitivity as a 100 percent lead azide mixture at higher loading pressures.

With PETN and RDX, there is a definite deflagration before a stable detonation develops in the build-up process. As the loading pressure is increased, the energy necessary to ignite the lead azide by a hot wire decreases. However, granular charges of PETN and RDX build to detonation much more easily at low densities than at high densities. Therefore, as the loading pressure is increased, less energy is necessary to initiate the lead azide, but the PETN and RDX become increasingly difficult to detonate. This can be readily seen in a comparison of the build-ups of the mixtures containing dextrinated lead azide loaded at 10,000 and 30,000 p.s.i. as illustrated in FIGS. 4 and 5 and FIGS. 12 and 13, respectively.

The transient build-up phenomenon of the detonation wave front are quite varied. Three types of transient build-up have been observed with the binary mixtures investigated. The first type as illustrated in FIGS. 4 and 5 is the 80/20 mixtures of milled dextrinated lead azide PETN and milled dextrinated lead azide RDX loaded at 10,000 p.s.i. These figures show a continuously accelerating detonation indicative of a slight secondary explosive contribution. This type of build-up is definitely dominated by the dextrinated lead azide and is almost exactly similar to that observed with pure dextrinated lead azide.

The second type of build-up is illustrated by the 60/40 mixtures of dextrinated lead azide PETN and dextrinated lead azide RDX. These showed an accelerating deflagration with a sharp transition to a high velocity detonation regime. It has been proposed that an accelerating deflagration will produce precursor pressure pulses. These pulses can coalesce under favorable conditions to form a shock front which leads to a detonation by an acceleration of the reaction in the shock region. The transition appears to be discontinuous because of the rapid velocity of the shock wave. Experiments tend to confirm the above proposal. Experimental shots which had an accelerating deflagration also tend to confirm the above statement and all indicate an abrupt transition from deflagration to detonation.

A third type of build-up is shown in FIGS. 8 and 9 which illustrate the 80/20 and the 60/40 mixtures of PVA lead azide/PETN and PVA lead azide/RDX. These mixtures showed a stable low velocity regime which passes through a sharp transition to the high velocity regime. A similar build-up with an initial steady state low velocity regime has been found by diluting PVA lead azide with 20% sucrose. The sucrose provides some physical separation and possibly some energy absorption. Its addition results in an initial steady state propagation. The physical separtaion and energy absorption effect may delay bulk detonation by lowering pressures in the initial stages of the reaction. A surface burning occurs until a definite energy barrier is overcome. The energy barrier may be overcome from the increase in pressure resulting from back confinement of the gaseous products of the composition. The transition appears to arise from this type of effect rather than from a local inhomogeniety in the binary mixture. In the initial stages, PETN and RDX appear to act as diluents similar to the sucrose with perhaps more afterburning. When the pressure increases high enough their detonation is affected.

Where high velocity detonation did not result, especially with the PETN and RDX mixtures, it appears that propagation is mainly due to the lead azide since a constant or accelerating burning was observed. Pure PETN or RDX under the same experimental conditions would have shown a decelerating burning indicative of impending extinguishment.

As shown in FIGS. 12 and 13, RDX loaded at 30,000 p.s.i. enters into the reaction with the 80/20 mixture of dextrinated lead azide/RDX. The corresponding PETN mixture gave a propagation even slower than that of the lead azide. It is believed that this result was influenced in part by the relative particle sizes of the two secondary explosives. The finer RDX crystals provided a greater number of burning centers and had a shorter burning time because of its greater surface to volume ratio. This favors its transition to detonation. The probability of transition to the high velocity regime is reduced at the 30,000 p.s.i. loading even though the higher loading pressure increases the contact area between the dextrinated lead azide and the PETN or RDX crystals. This indicates that interstitial gaps are mainly responsible for the transition mechanism.

Thus experimentation has conclusively shown that increasing density lowers the probability of attaining a detonation velocity characteristic of the secondary explosive in binary mixtures of lead azide with PETN or RDX. The optimum detonation velocities are obtained with mixtures containing 40% by weight of the secondary explosive. Increasing the secondary explosive percentage above 40% lowers the probability of attaining a detonation velocity characteristic of the secondary explosive within limited dimensions.

Binary mixtures of lead azide with PETN or RDX retain the hot wire sensitivity of the lead azide over a wide range of composition.

Dextrinated lead azide is more susceptible to the dead pressing than PVA lead azide and the latter is superior in performance to the dextrinated lead azide.

The output of the test detonators was measured by the depth of a dent produced in a steel block. The depth of dent has been found to have a close correlation with the ability of a detonator to initiate the next component in an explosive train. At the 10,000 and 20,000 p.s.i. loading pressures the dent values using brass confinement were similar to those observed with conventional multiple charge detonators.

The use of binary mixtures of the type described in weapon detonators will require a definite minimum confinement for practicality.

It is realized that many modifications of the compositions hereinabove described will present themselves to those skilled in the art, without departing from the spirit and scope of this invention. For example, silver or other metal azides could replace lead azide as a primary explosive. It is to be particularly understood therefore that this invention is not limited to the specific details herein referred to.

What is claimed is:

1. In an explosive detonator including a container for housing an explosive charge, the improvement comprising,
   a single charge within said container consisting of a binary mixture of primary and secondary explosives wherein said primary explosive is selected from the group consisting of lead azide and silver azide and said secondary explosive is selected from the group consisting of PETN and RDX, and
   hot bridge wire means within said container and in intimate contact with said binary mixture under pressures in excess of 10,000 pounds per square inch whereby relatively low energy applied to said hot bridge wire means will detonate said mixture.

2. The detonator of claim 1 wherein
   said lead azide is approximately 60% by weight of said binary mixture and said secondary explosive is approximately 40% by weight of said binary mixture.

References Cited

UNITED STATES PATENTS

| | | | |
|---|---|---|---|
| 2,360,698 | 10/1944 | Lyte | 149—35 X |
| 2,918,871 | 12/1959 | Taylor | 102—28 X |
| 2,980,019 | 4/1961 | Noddin | 102—28 |
| 2,996,007 | 8/1961 | Franklin | 102—28 X |
| 3,040,660 | 6/1962 | Johnston | 102—28 |
| 3,155,553 | 11/1964 | Taylor et al. | 102—28 X |

FOREIGN PATENTS

| | | |
|---|---|---|
| 280,249 | 8/1928 | Great Britain. |
| 528,299 | 10/1940 | Great Britain. |

OTHER REFERENCES

"Military Explosives," Dept. of the Army Technical Manual 9-1910, April 1955, p. 94 relied on.

BENJAMIN A. BORCHELT, *Primary Examiner.*

SAMUEL FEINBERG, *Examiner.*

G. L. PETERSON, G. H. GLANZMAN,
*Assistant Examiners.*